US009014839B2

(12) United States Patent
Neumaier et al.

(10) Patent No.: US 9,014,839 B2
(45) Date of Patent: Apr. 21, 2015

(54) PROCESS FOR PRODUCING A TOOTHED WHEEL HAVING A HERRINGBONE GEARING AND A PROCESS AND AN APPARATUS FOR GENERATING CONTROL DATA TO FORM A HERRINGBONE GEARING ON A WORKPIECE

(75) Inventors: Josef Neumaier, Pfronten (DE);
Thomas Lochbihler, Vils (AT);
Uwe-Carsten Hansen, Eisenberg (DE)

(73) Assignee: Deckel Maho Pfronten GmbH, Pfronten (DE)

( * ) Notice: Subject to any disclaimer, the term of this patent is extended or adjusted under 35 U.S.C. 154(b) by 801 days.

(21) Appl. No.: 13/238,692

(22) Filed: Sep. 21, 2011

(65) Prior Publication Data
US 2012/0114441 A1 May 10, 2012

(30) Foreign Application Priority Data
Sep. 27, 2010 (DE) .......................... 10 2010 041 489

(51) Int. Cl.
*G06F 19/00* (2011.01)
*G05B 19/4093* (2006.01)
*G05B 19/18* (2006.01)

(52) U.S. Cl.
CPC . *G05B 19/40937* (2013.01); *Y10T 409/100159* (2015.01); *G05B 19/186* (2013.01)

(58) Field of Classification Search
USPC ............................... 700/186; 29/893; 74/458
See application file for complete search history.

(56) References Cited

U.S. PATENT DOCUMENTS

| | | | |
|---|---|---|---|
| 2002/0020240 A1* | 2/2002 | Epshteyn | 74/440 |
| 2003/0109355 A1* | 6/2003 | Allen et al. | 475/344 |
| 2004/0031152 A1* | 2/2004 | Jinkins et al. | 29/893 |
| 2005/0028626 A1* | 2/2005 | Fleytman | 74/416 |
| 2005/0081668 A1* | 4/2005 | Hagihara | 74/458 |
| 2007/0112455 A1* | 5/2007 | Blumberg et al. | 700/182 |
| 2008/0276742 A1* | 11/2008 | Hagihara | 74/458 |
| 2010/0204814 A1* | 8/2010 | Neumaier et al. | 700/97 |

FOREIGN PATENT DOCUMENTS

DE     10 2009 008 124 A1     8/2010
WO     WO 2008/133517 A1     11/2008

OTHER PUBLICATIONS

Schossig; "Auf einfachem Weg zu guten Záhnen-Zahnráder mit hoher Qualitát auf Standardmaschinen frásen;" *Werkstan und Betrieb*; 2007; pp. 28-32; No. 4/28; Carl Hanser Verlag, Munich (with partial translation).

* cited by examiner

*Primary Examiner* — Robert Fennema
*Assistant Examiner* — Anthony Whittington
(74) *Attorney, Agent, or Firm* — Oliff PLC

(57) ABSTRACT

A process and an apparatus for generating control data, wherein a first tooth flank geometry is determined which corresponds to a geometry of a first tooth flank of the herringbone gearing, a second tooth flank geometry is determined which corresponds to a geometry of a second tooth flank of the herringbone gearing, a transition section geometry is determined which corresponds to a geometry of a transition section between the first tooth flank and the second tooth flank, an overall tooth flank geometry is determined which comprises the first tooth flank geometry, the transition section geometry and the second tooth flank geometry, and the control data is generated based on the overall tooth flank geometry and machining paths are indicated, each extending transversely to the profile direction of the tooth flanks and along the first tooth flank geometry, the transition section geometry and the second tooth flank geometry.

20 Claims, 12 Drawing Sheets

US 9,014,839 B2

PROCESS FOR PRODUCING A TOOTHED WHEEL HAVING A HERRINGBONE GEARING AND A PROCESS AND AN APPARATUS FOR GENERATING CONTROL DATA TO FORM A HERRINGBONE GEARING ON A WORKPIECE

The present invention relates to a process for producing a toothed wheel having a herringbone gearing by means of milling a workpiece on a numerically controlled machine tool comprising at least 4 axes, in particular on a milling machine, a universal machine tool or a machining center by successively moving a milling cutter, in particular an end mill, of the machine tool along machining paths relative to the workpiece based on control data, comprising generating the control data based on a tooth flank geometry, the control data indicating path data for guiding the milling cutter of the machine tool along machining paths, and milling the workpiece on the machine tool using the milling cutter based on the generated control data, the milling cutter being successively guided along the machining paths indicated by the path data.

Furthermore, the present invention relates to processes and an apparatus for generating control data for forming a herringbone gearing on a workpiece according to an above described manufacturing process by milling the workpiece on a numerically controlled machine tool comprising at least 4 axes by successively moving a milling cutter of the machine tool along machining paths relative to the workpiece based on the control data.

Furthermore, the present invention relates to a numerically controlled machine tool comprising at least 4 axes, in particular to a milling machine, a universal machine tool or a machining center, for milling a workpiece by successively moving a milling cutter, in particular an end mill, of the machine tool along machining paths based on generated control data, comprising an apparatus for generating control data, and the present invention also relates to a computer program product which comprises a computer-readable medium and a computer program stored therein and including commands, wherein the computer program can be processed by data processing means of a data processing device so as to form an apparatus for generating control data.

BACKGROUND OF THE INVENTION

It is common practice in the prior art to produce toothed wheels or other workpieces having a gearing on special gearing-forming machine tools, i.e. on special single-purpose machines. For example, special gear hobbing machines are known on which a workpiece is machined so as to be provided with a tooth profile by guiding a profile hob or a profile grinding wheel such that the workpiece is machined so as to produce tooth flanks or teeth. Here, the hobs or profile grinding wheels already have a cross-sectional shape in accordance with the desired profile shape of the tooth flanks to be produced with which the workpiece is to be provided. One or two opposite tooth flanks, which have the profile according to the shape of the tool, are formed by guiding the gear hob or the profile grinding wheel along a path through the workpiece.

If a toothed wheel having a herringbone gearing, in particular a toothed wheel having left-hand and right-hand helical gearings (also referred to as double helical gearing) on such single-purpose machines by means of profile grinding wheels or profile hobs, it is first necessary to machine one or a plurality of tooth profiles of one helical gearing in a first processing step, and then one or a plurality of tooth profiles of the other helical gearing having opposite pitch can be machined in another processing step. This results in an expensive and time-consuming manufacturing process of the toothed wheel having the herringbone gearing. Moreover, the teeth of the herringbone gearing cannot be machined continuously in the conventional processes on single-purpose machines using a profile hob or a profile grinding wheel as when a tooth of one helical gearing is machined by means of a profile hob or a profile grinding wheel up to the middle of the herringbone gearing, this tool will already cut or grind into a tooth flank of a tooth of the other helical gearing. For this reason, a workpiece having a central groove that separates the two helical gearings of the herringbone gearing is used for the production of a toothed wheel having a herringbone gearing by means of a profile hob or a profile grinding wheel.

This is illustrated by way of example in FIG. 1, which shows a perspective view of a workpiece 10 having a central groove 11 circumferential around the rotationally symmetrical workpiece. The workpiece 10 also already has a space width 12 of one helical gearing and a space width 13 of the other helical gearing. The opposite tooth flanks 12a and 12b of the space width 12 are separated from the tooth flanks 13a and 13b of the space width 13 by the central groove 11. This prevents a profile hob or a profile grinding wheel from cutting or grinding into a tooth flank of the respectively other space width when the space widths 12 are machined. FIG. 2 shows a detail of space widths 12 and 13 of FIG. 1 by way of example. FIG. 3 shows a top view onto space widths 12 and 13 of FIG. 1 by way of example. As shown in FIG. 3, the two helical gearings of the herringbone gearing have opposed pitches and equal helix angles. Groove 11 has a groove width NB. The finished toothed wheel thus has teeth of the two helical gearings of the herringbone gearing which in each case are separated in the tip of the herringbone gearing by groove 11 having groove width NB. However, when two toothed wheels roll, the material is exposed to high loads and stresses, especially on the outer sides of flanks 12a, 12b, 13a and 13b on the outer surface and in particular on the edges of the tooth flanks 12a, 12b, 13a and 13b which face groove 11. This reduces the loadability of the toothed wheel during rolling with a toothed wheel having mating flanks under load.

However, the present invention relates to a newly developed method of producing workpieces having a gearing on numerically controlled universal machine tools comprising at least 5 axes, such as a milling machine, a universal milling machine or a machining center, in which the gearing is produced on the workpiece by successively moving standard milling cutters, such as an end mill with or without end radius, in a line-by-line process along machining paths so as to cut a tooth flank out of the workpiece. In contrast to the production of workpieces having a gearing on the above known, conventionally used gearing-forming single-purpose machines, the object of the invention is to provide a workpiece with a gearing on universal machine tools, such as a milling machine, a universal milling machine or a machining center.

Such a production of a workpiece having a gearing on a universal machine tool is described in the Article "Auf einfachem Weg zu guten Zähnen-Zahnräder mit hoher Qualität auf Standardmaschinen fräsen" by Hans-Peter Schossig (published in the journal WERKSTATT UND BETRIEB, Carl Hanser Verlag, Munich, issue 2007, no. 4/28, pages 28-32, ISSN 0043-2792) and WO 2008/133517 A1, for example. The present invention is based on this newly developed method and its further developments developed by Applicant itself (see e.g. DE 10 2009 008 124).

It has been discovered with respect to the above described drawbacks regarding the production of a toothed wheel having a herringbone gearing on single-purpose machines by means of a profile hob or a profile grinding wheel that the loadability of a toothed wheel having a herringbone gearing can be considerably improved when the teeth of one helical gearing are not separated from the teeth of the other helical gearing by a central groove but when the workpiece is continuously machined so as to provide it with teeth. It has also been discovered that this can be achieved by the newly developed method, i.e. producing tooth flanks by means of a milling cutter, in particular an end mill, on a universal machine, such as a milling machine, a universal milling machine or a machining center, as opposed to processes on single-purpose machines having profile hobs or profile grinding wheels. FIG. 4 shows a photographic illustration of a toothed wheel having a herringbone gearing according to a first attempt of producing a workpiece having a herringbone gearing on a universal machine tool by means of an end mill according to a process in accordance with the newly developed method. FIG. 5 shows a photographic detail of the toothed wheel of FIG. 4.

The toothed wheel of FIGS. 4 and 5 no longer has a central groove; the teeth of the two helical gearings of the herringbone gearing are continuously shaped over the entire tooth width of the herringbone gearing and connected with one another in the central tip of the herringbone gearing over the entire depth of teeth, thus considerably improving the loadability of the herringbone gearing in contrast to a toothed wheel having a herringbone gearing and a central groove. However, the tooth flanks 12a and 13a or 12b and 13b of the space widths 12 and 13 of both helical gearings are separated by a central milled recess 11' so that there is no rolling surface with a mating flank of a mating toothed wheel in the central tip of the herringbone gearing. The tooth flanks are thus prevented from converging or merging into one another at an acute angle in the center region, which might impair the rolling characteristics.

The tooth flanks 12a, 12b, 13a and 13b were machined separately according to a process as known from the Article "Auf einfachem Weg zu guten Zähnen-Zahnräder mit hoher Qualität auf Standardmaschinen fräsen" by Hans-Peter Schossig. The tooth flanks 12a, 12b, 13a or 13b were thus machined separately by successively moving an end mill along machining paths extending at different profile heights in the flank line direction. Correspondingly, FIG. 5 shows milling tracks in the flank line direction in the area of the tooth base between the tooth flanks 12a and 13a or 12b and 13b. The central recess 11' was then cut by means of an end mill by guiding the end mill along machining paths extending in the profile direction as can be seen in FIG. 5 by means of the milling tracks in the area of recess 11'. However, this process is also expensive and calls for a long machining time since the tooth flanks are machined separately, followed by machining the recess 11' using a milling cutter having a small tool size and thus a small cutting volume. In addition, high loads occur in the boundary regions of tooth flanks 12a, 12b, 13a and 13b, which border on recess 11', since no rolling area is available in the central tip of the herringbone gearing.

SUMMARY OF THE INVENTION

With respect to the above described prior art processes known for the production of a toothed wheel having a herringbone gearing it is an object of the present invention to further facilitate the machining and/or production of a toothed wheel having a herringbone gearing, thus reducing the machining times. It is also an object of the present invention to improve the machining and/or the production of a toothed wheel having a herringbone gearing on a numerically controlled universal machine tool so as to produce a toothed wheel having a herringbone gearing with greater strength and improved running characteristics.

In order to achieve the above described objects, the present invention proposes a process for producing a toothed wheel having a herringbone gearing according to claim 1, a process for generating control data for forming a herringbone gearing on a workpiece according to claim 17, an apparatus for generating control data for forming a herringbone gearing on a workpiece according to claim 18, a numerically controlled machine tool comprising at least 4 axes according to claim 19, and a computer program product according to claim 20. Features of preferred embodiments of the present invention are described in the dependent claims.

The present invention proposes a process for producing a toothed wheel having a herringbone gearing by means of milling a workpiece on a numerically controlled machine tool comprising at least 4 axes, in particular on a milling machine, a universal machine tool or a machining center, by successively moving a milling cutter, in particular an end mill, of the machine tool along machining paths relative to the workpiece based on control data. The manufacturing process comprises generating the control data for guiding the milling cutter relative to the workpiece and milling the workpiece on the machine tool by means of the milling cutter based on the generated control data.

The step of generating the control data comprises determining a first tooth flank geometry, in particular based on predetermined gearing information, the first tooth flank geometry corresponding to a geometry of a first tooth flank of a first partial gearing of the herringbone gearing, determining a second tooth flank geometry, in particular based on predetermined gearing information, the second tooth flank geometry corresponding to a geometry of a second tooth flank of a second partial gearing of the herringbone gearing, determining a transition section geometry which corresponds to a geometry of a transition section between the first tooth flank and the second tooth flank, determining an overall tooth flank geometry which comprises the first tooth flank geometry, the transition section geometry and the second tooth flank geometry, and generating the control data based on the overall tooth flank geometry, the control data indicating path data for guiding the milling cutter of the machine tool along machining paths, each of the machining paths extending transversely to the profile direction of the tooth flanks, in particular at different profile heights, and along the first tooth flank geometry, the transition section geometry and the second tooth flank geometry.

The milling is carried out based on the generated control data, the milling cutter being successively guided along the machining paths indicated by the path data.

The process according to the invention thus offers the advantage that a first tooth flank of the one partial gearing of a herringbone gearing, in particular of the one helical gearing of the herringbone gearing, a second tooth flank of the other partial gearing of a herringbone gearing, in particular of the other helical gearing of the herringbone gearing, and a transition region between the first tooth flank and the second tooth flank may be made in one processing step since the milling cutter can always be guided along machining paths where the machining paths always extend without interruption along the first tooth flank geometry of the first tooth flank, the transition section geometry of the transition section and the second tooth flank geometry of the second tooth flank. Machining can thus be carried out more efficiently, and the machining time can be reduced.

Furthermore, as a result of the machining paths, each extending without interruption along the first tooth flank geometry of the first tooth flank, the transition section geometry of the transition section and the second tooth flank geometry of the second tooth flank, smooth and gentle transitions are formed in the transition section between the central transition section and the boundary regions of the tooth flanks so as to be able to reduce the loads during rolling under load in the boundary region of the tooth flanks and to even increase the strength of the gearing. In addition, the uninterrupted direct guidance of the machining paths along the first tooth flank geometry, the transition section geometry and the second tooth flank geometry enable machining on account of a continuous movement of the machine tool axes, higher machining accuracy and better surface finish.

Moreover, the intermediate area between the space widths of the partial gearings of the herringbone gearing can be cut out with larger tools and thus with a higher cutting volume so as to further reduce the machining time. All in all, the machining step for the toothed wheel production can be carried out very efficiently with large tools having a high cutting volume.

Since on account of the transition section the teeth of one partial gearing of the herringbone gearing are connected with the teeth of the other partial gearing of the herringbone gearing and are not separated by a groove, the loadability and strength of the gearing can be considerably increased with respect to a toothed wheel having a herringbone gearing with a central groove.

The transition section geometry is preferably produced such that at a plurality of boundary points of the first tooth flank geometry the first tooth flank geometry merges tangentially into the transition section geometry and, at a plurality of boundary points of the second tooth flank geometry, the transition section geometry merges tangentially into the second tooth flank geometry. Thus, tangential transitions are advantageously formed between the central transition region and the tooth flanks and it is thus possible to determine the course of the machining paths even more continuously and efficiently and further reduce the loads occurring during rolling under load in the boundary region of the tooth flanks, thus producing an even greater gearing strength. In addition, the tangential transitions to the transition section advantageously enable a gentle and continuous movement of the round axes of the machine tool while the milling cutter is guided along the machining paths, thus achieving higher machining accuracy and greater surface finish. Moreover, stress peaks in the material accompanied by high load of the gearing can more strongly be reduced on account of the tangential transitions to the transition section.

The boundary points of the first tooth flank geometry are preferably determined on a first cutting path between the first tooth flank geometry and a first cut surface perpendicular to the toothed wheel axis, and the boundary points of the second tooth flank geometry are preferably determined on a second cutting path between the second tooth flank geometry and a second cut surface perpendicular to the toothed wheel axis. This enables a simple determination of the boundary region of the tooth flanks in the transition to the central transition section.

Preferably, the step of generating the control data also comprises determining a central area of the herringbone gearing, which is perpendicular to the toothed wheel axis, the first cut surface and the second cut surface preferably having equal distance from the central area of the herringbone gearing and the central area being preferably disposed between the first and second cut surfaces. This enables a further simplified determination of the boundary portion of the tooth flanks, which is symmetric with respect to the herringbone gearing symmetry, in the transition to the central transition section.

The transition section geometry preferably has a concave shape or convex shape in the tooth flank line direction. Thus, both the convex flank side of the teeth of the herringbone gearing and the concave flank side of the teeth of the herringbone gearing, which is opposite to the convex flank side, can be produced by means of the process according to the invention.

The transition section geometry preferably corresponds to a rounded surface, in particular a fillet surface, between the first tooth flank geometry and the second tooth flank geometry. Hence, an advantageously continuous geometry is created for the transition section between the tooth flanks of the partial gearings of the herringbone gearing, it being possible to shape or define the transition section geometry in simple fashion by circular arch segments.

The transition section geometry is preferably determined by a plurality of circular arc segments connecting the first tooth flank geometry and the second tooth flank geometry. This leads to a rounded transition area, which can easily be shaped in advantageous manner (e.g. by means of a CAD system), in the transition section between the tooth flanks of the partial gearings of the herringbone gearing. Furthermore, the circular arc segment shape of the transition section between the tooth flanks enables a gentle and continuous movement of the round axes of the machine tool while the milling cutter is guided along the machining paths so as to achieve higher machining accuracy and greater surface finish.

The circular arc segments of the transition section geometry preferably extend at different profile heights and it is preferred for each circular arc segment to connect a respective first boundary point of the first tooth flank geometry with a respective second boundary point of the second tooth flank geometry, the respective first boundary point and the respective second boundary point being preferably determined at equal profile height. Here, equal profile height means in particular at equal distance from the tooth base in the case of symmetric tooth flanks, the boundary points having in particular equal distance from the workpiece axis or toothed wheel axis.

At the respective boundary points of the respective tooth flank geometry, it is preferred for the circular arc segments to merge tangentially into the respective tooth flank geometry. This leads to advantageously tangential transitions between the central transition area and the tooth flanks so that the course of the machining paths can be determined even more continuously and efficiently and the loads occurring during rolling under load in the boundary region of the tooth flanks can be further reduced so as to produce an even greater gearing strength. In addition, the tangential transitions to the transition section and the circular arc segment shape enable an optimum smooth and continuous movement of the round axes of the machine tool while the milling cutter is guided along the machining paths so as to achieve optimum machining accuracy and optimum surface finish. Besides, stress peaks in the material under high load of the gearing can be considerably reduced on account of the tangential transitions to the transition section and the continuous circular arc segment shape.

The step of producing a transition section geometry preferably comprises the steps of determining at least one first boundary point of the first tooth flank geometry, determining at least one second boundary point of the second tooth flank geometry, the first boundary point and the second boundary point being determined at equal profile height of the tooth flanks, determining a first normal vector on the first tooth flank geometry in the first boundary point, determining a second normal vector on the second tooth flank geometry in the second boundary point, determining an intersection point between a first straight line and a second straight line, the first straight line being predetermined by the direction of the first normal vector and the second straight line being predetermined by the direction of the second normal vector, and determining a circular arc segment from the first boundary point to the second boundary point, the intersection point between the first straight line and the second straight line being the center of the circular arc segment, the transition section geometry being produced so as to comprise the circular arc segment. In particular, the step of producing a transition section geometry comprises the steps of determining a first group of boundary points of the first tooth flank geometry, each of the boundary points of the first group being determined at different profile heights of the first tooth flank geometry, determining a second group of boundary points of the second tooth flank geometry, each boundary point of the second group being determined at equal profile height with a respective boundary point of the first group, determining a first group of normal vectors on the first tooth flank geometry, in each case one normal vector of the first group of normal vectors being determined in a boundary point of the first group of boundary points, determining a second group of normal vectors on the second tooth flank geometry, in each case a normal vector of the second group of normal vectors being determined in a boundary point of the second group of boundary points, determining a group of intersection points, each intersection point being an intersection point between a straight line of a first group of straight lines and a straight line of a second group of straight lines, each straight line of the first group of straight lines being predetermined by the direction of a normal vector of the first group of normal vectors and each straight line of the second group of straight lines being predetermined by the direction of a normal vector of the second group of normal vectors, and determining a group of circular arc segments, each circular arc segment connecting a boundary point of the first group of boundary points with a boundary point of the second group of boundary points, which is disposed at equal profile height, an intersection point of the first straight line and the first straight line being the center of the circular arc segment and the transition section geometry being produced so as to comprise the group of circular arc segments.

As a result of this preferred process, one or several circular arc segments can be defined in a particularly simple manner for shaping the transition section geometry between the tooth flanks of the partial gearings of the herringbone gearing, which at the respective boundary points of the tooth flanks merge tangentially into the tooth flank areas since the circular arc segments are designed based on the intersection points of the surface normals in the boundary points of the tooth flank geometries, which are located at equal profile height. On account of the profile shape, e.g. an evolvent, of the tooth flanks circular arc segments, each having different circular arc radii (fillet radii), are optionally formed at different profile heights.

When the first tooth flank and the second tooth flank have equal profile shape and equal helix angle, the equal profile height of paired boundary points of the first and second tooth flank geometries ensures that the surface normals through the boundary points each intersect in pairs at a common intersection point. However, if the profile shapes of the first and second tooth flanks differ and/or if the helix angle of the first tooth flank differs from the helix angle of the second tooth flank, the paired boundary points of the first and second tooth flanks can each be determined at different profile height such that an intersection point is again formed between the paired surface normals through the paired boundary points of the first and second tooth flank. Irrespective of the accurate profile shape of the tooth flanks and the accurate position of the boundary points relative to the tip of the herringbone gearing, each circular arc segment whose center is determined as an intersection point between two surface normals through paired boundary points of the first and second tooth flanks defines a circular arc segment having respective tangential transitions in the first and second tooth flanks.

The first partial gearing is preferably a first helical gearing of the herringbone gearing and the second partial gearing is preferably a second helical gearing of the herringbone gearing. The first helical gearing is preferably left-hand or right-hand and the second helical gearing preferably has a pitch opposed to the pitch of the first helical gearing, in particular preferably an opposed pitch having equal helix angle. However, the present invention is not limited to herringbone gearings having two helical gearings, which have a straight course in the flank line direction; the present invention can rather also be used for herringbone gearings whose partial gearings have a course differing from the straight course in the flank line direction and e.g. extend in the flank line direction along a circular arc, an evolvent or another bent curve.

The first tooth flank geometry and the second tooth flank geometry preferably have an equal tooth flank profile shape, in particular preferably the same evolvent profile shape. As a result it is possible to ensure, at equal distance of the boundary points of the first tooth flank and the second tooth flank from the central area of the herringbone gearing which is perpendicular to the axis of the tooth wheel having the herringbone gearing and at equal profile height of paired boundary points of the first and second tooth flanks, that the paired surface normals through the paired boundary points have a common intersection point.

The overall tooth flank geometry is preferably a first overall tooth flank geometry which has a concave shape in the tooth flank line direction, and the step of generating control data preferably comprises determining a third tooth flank geometry corresponding to a geometry of a third tooth flank, opposite to the first tooth flank geometry, of the first partial gearing of the herringbone gearing, determining a fourth tooth flank geometry which corresponds to a geometry of a fourth tooth flank, opposite to the second tooth flank geometry, of the second partial gearing of the herringbone gearing, determining a second transition section geometry which corresponds to a geometry of a transition section between the third tooth flank and the fourth tooth flank and has a convex shape in the tooth flank line direction, and determining at least one second overall tooth flank geometry which comprises the third tooth flank geometry, the second transition section geometry and the fourth tooth flank geometry, wherein the control data is still generated based on the second overall tooth flank geometry and indicates further path data for guiding the milling cutter of the machine tool, with each of the further machining paths extending transversely to the profile direction of the third and fourth tooth flanks and along the third tooth flank geometry, the second transition section geometry and the fourth tooth flank geometry. Thus, both the convex flank side of the teeth of the herringbone gearing and the concave flank side of the teeth of the herringbone gearing, which is opposite to the convex flank side, can advantageously be machined by means of the process according to the invention.

The first transition section geometry is preferably produced such that at a plurality of boundary points of the first tooth flank geometry the first tooth flank geometry merges substantially tangentially into the first transition section geometry and, at a plurality of boundary points of the second tooth flank geometry, the first transition section geometry merges substantially tangentially into the second tooth flank geometry, and the second transition section geometry is preferably produced such that at a plurality of marginal points of the third tooth flank geometry the third tooth flank geometry merges substantially tangentially into the second transition section geometry and, at a plurality of boundary points of the fourth tooth flank geometry, the second transition section geometry merges substantially tangentially into the fourth tooth flank geometry. The boundary points of the first tooth flank geometry are preferably determined on a first cutting path between the first tooth flank geometry and a first cut surface perpendicular to the toothed wheel axis, and the boundary points of the second tooth flank geometry are preferably determined on a second cutting path between the second tooth flank geometry and a second cut surface perpendicular to the toothed wheel axis. In addition, the boundary points of the third tooth flank geometry are preferably determined on a third cutting path between the third tooth flank geometry and a cut surface perpendicular to the toothed wheel axis, and the boundary points of the fourth tooth flank geometry are preferably determined on a fourth cutting path between the fourth tooth flank geometry and a fourth cut surface perpendicular to the toothed wheel axis.

The distance between the first cut surface and the second cut surface is preferably smaller than that between the third cut surface and the fourth cut surface. This advantageously enables the formation of the concave transition section geometry of the herringbone gearing from circular arc segments having a smaller radius than that of the convex transition section geometry of the herringbone gearing. This results in an overall geometry of the gearing where the backlash is increased from a boundary region of the tooth flanks in a gentle and tangential transition towards the center or tip of the herringbone gearing. It is thus possible to adjust the size of the central area of the teeth of the herringbone gearing where the convex tooth flank side does not roll with the concave tooth flank side by suitably selecting the distances between the first cut surface and the second cut surface and between the third cut surface and the fourth cut surface. A rolling area of the tooth flanks can also be optimized by suitable adjustment of the distances between the first cut surface and the second cut surface and between the third cut surface and the fourth cut surface so as to be able to create a supporting rolling surface up to the center or at least substantially to the center of the herringbone gearing. As a result it is possible to further optimize the running characteristics of the herringbone gearing and also increase the loadability of the herringbone gearing since the load can be distributed more uniformly during rolling.

The boundary points of a tooth flank in the transition region to a concave transition section geometry and the boundary points of an opposite tooth flank in the transition area to a convex transition section geometry are preferably chosen such that the boundary points of the tooth flank in the transition area to the concave transition section geometry and the boundary points of the opposite tooth flank in the transition area to the convex transition section geometry have pair-wise the same distance from the central axis of the workpiece or toothed wheel so that the boundary points are located in pairs in particular on a circular arc which lies in a plane perpendicular to the central axis of the workpiece or toothed wheel and whose center is located on the central axis.

A further aspect of the present invention proposes a process for generating control data for forming a herringbone gearing on a workpiece according to an above described manufacturing process, in particular preferably according to one or several of the preferred embodiments, by milling the workpiece on a numerically controlled machine tool comprising at least 4 axes, in particular on a milling machine, a universal machine tool or a machining center, by successively moving a milling cutter, in particular an end mill, of the machine tool along machining paths relative to the workpiece based on the control data. According to the invention, the generation of the control data comprises determining a first tooth flank geometry which corresponds to a geometry of a first tooth flank of a first partial gearing of the herringbone gearing, determining a second tooth flank geometry which corresponds to a geometry of a second tooth flank of a second partial gearing of the herringbone gearing, determining a transition section geometry which corresponds to a geometry of a transition section between the first and second tooth flanks, determining an overall tooth flank geometry which comprises the first tooth flank geometry, the transition section geometry and the second tooth flank geometry, and generating control data based on the overall tooth flank geometry, the control data indicating path data for guiding the milling cutter of the machine tool along machining paths, each of the machining paths extending transversely to the profile direction of the tooth flanks, in particular at different profile heights, and along the first tooth flank geometry, the transition section geometry and the second tooth flank geometry.

A further aspect of the present invention proposes an apparatus for generating control data for forming a herringbone gearing on a workpiece according to any of the above described manufacturing processes, in particular preferably according to one or a plurality of of the preferred embodiments, by milling the workpiece on a numerically controlled machine tool comprising at least 4 axes, in particular on a milling machine, a universal machine tool or a machining center, by successively moving a milling cutter, in particular an end mill, of the machine tool along machining paths relative to the workpiece based on the control data. According to the invention, the apparatus comprises a geometry shaping means for determining a first tooth flank geometry which corresponds to a geometry of a first tooth flank of a first partial gearing of the herringbone gearing, for determining a second tooth flank geometry which corresponds to a geometry of a second tooth flank of a second partial gearing of the herringbone gearing, for determining a transition section geometry which corresponds to a geometry of a transition section between the first and second tooth flanks, and for determining an overall tooth flank geometry which comprises the first tooth flank geometry, the transition section geometry and the second tooth flank geometry and a control data generation means for generating control data based on the overall tooth flank geometry, the control data indicating path data for guiding the milling cutter of the machine tool along machining paths, each of the machining paths extending transversely to the profile direction of the tooth flanks, in particular at different profile heights, and along the first tooth flank geometry, the transition section geometry and the second tooth flank geometry.

The control data is thus generated in the above described process for generating control data and in the above described apparatus for generating control data in the same way as in the above described manufacturing process and is accompanied in particular by the above described advantages. The control data is preferably generated in particular according to one or several of the above preferred aspects described with reference to the manufacturing process.

A further aspect of the present invention proposes a numerically controlled machine tool comprising at least 4 axes, in particular a milling machine, a universal machine tool or a machining center, for milling a workpiece by successively moving a milling cutter, in particular an end mill, of the machine tool along machining paths based on generated control data, which comprises an apparatus for generating control data according to the above described aspect of the present invention.

A further aspect of the present invention proposes a computer program product which comprises a computer-readable medium and a computer program stored therein, the computer program being stored as a sequence of states, which corresponds to commands that are adapted to be processed by a data processing means of a data processing device so that an apparatus for generating control data is formed according to the above described aspect of the present invention.

DETAILED DESCRIPTION OF PREFERRED EXEMPLARY EMBODIMENTS OF THE PRESENT INVENTION

Figure 1:
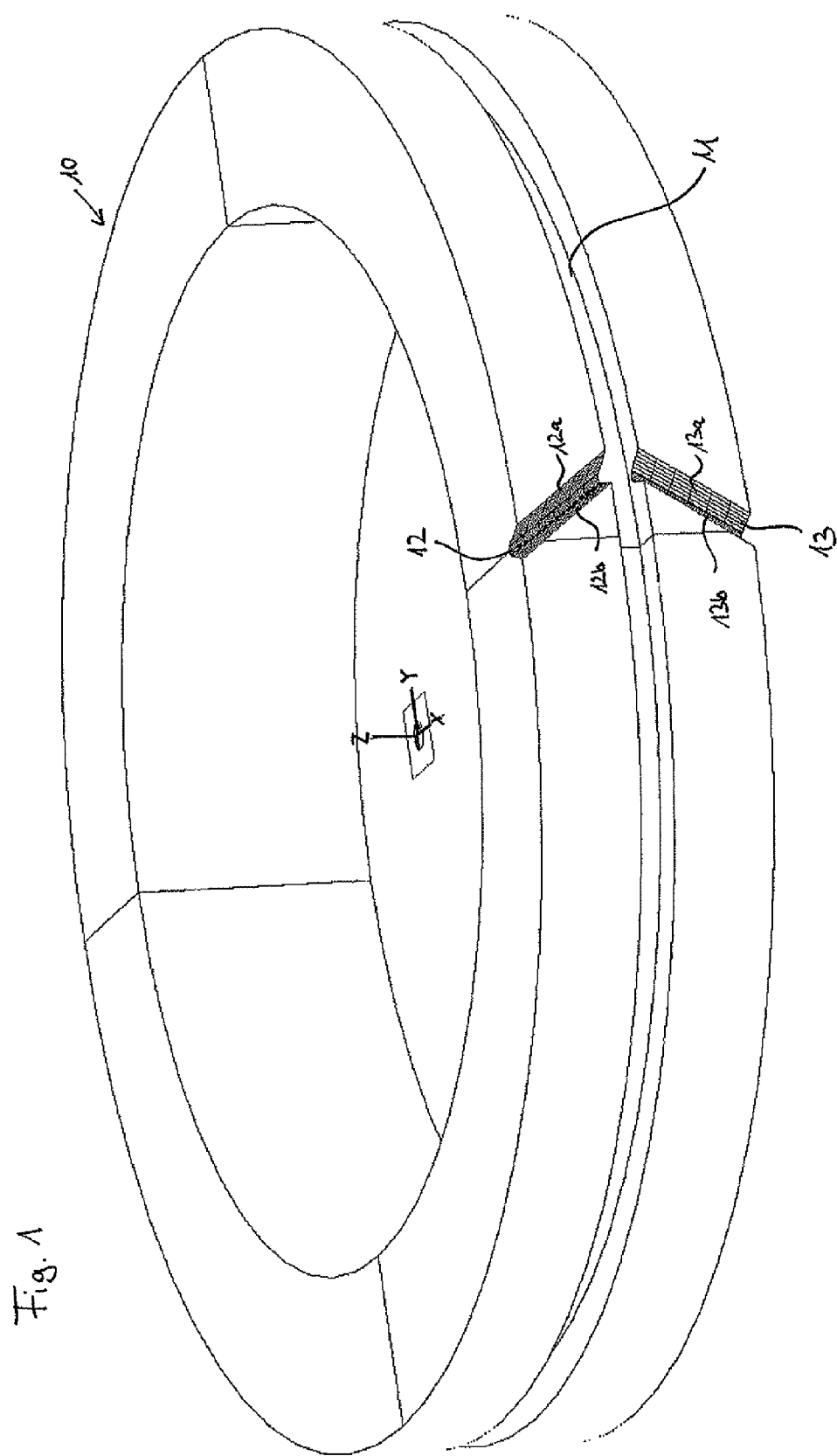
FIG. 1 shows an exemplary perspective view of a workpiece having a central groove and two space widths of a herringbone gearing.
Figure 2:
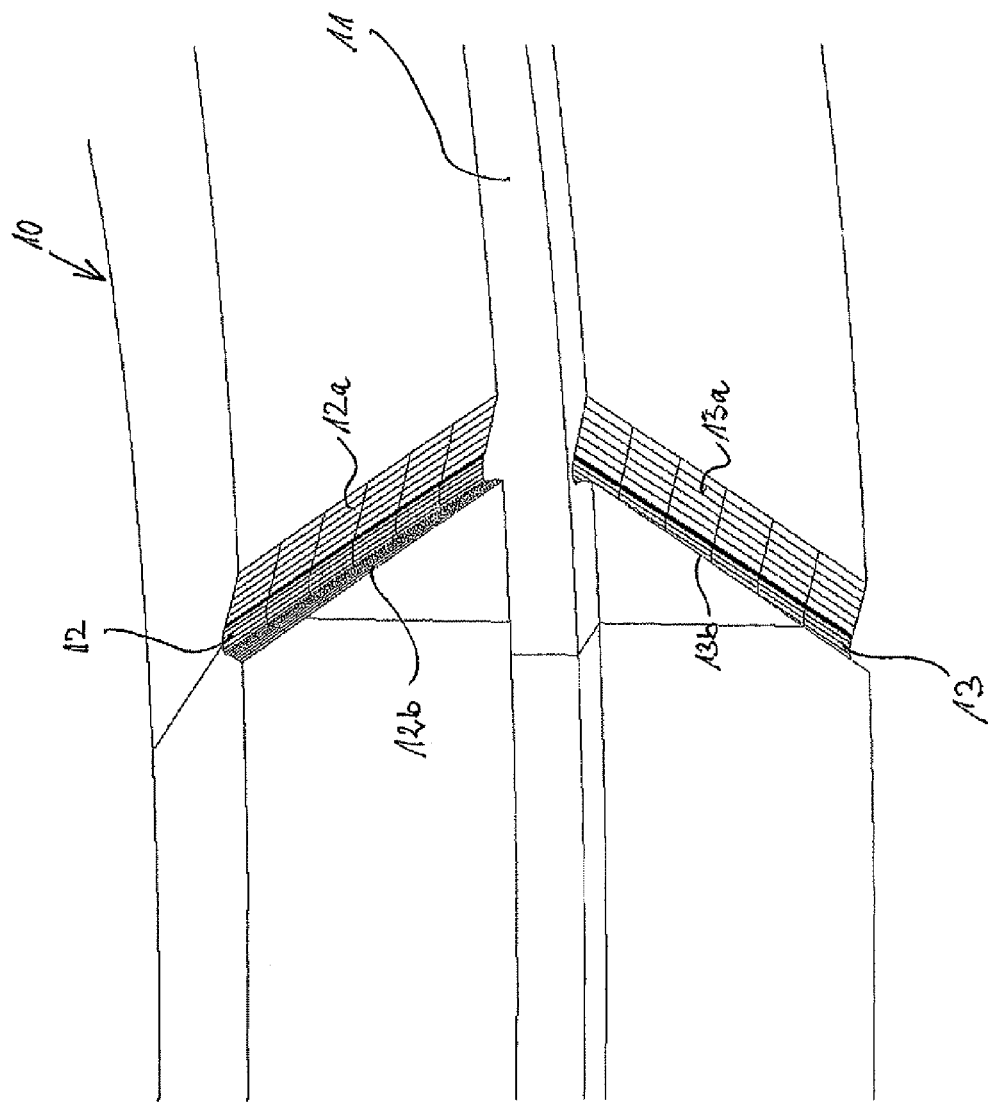
FIG. 2 shows a detail of a workpiece of FIG. 1.
Figure 3:
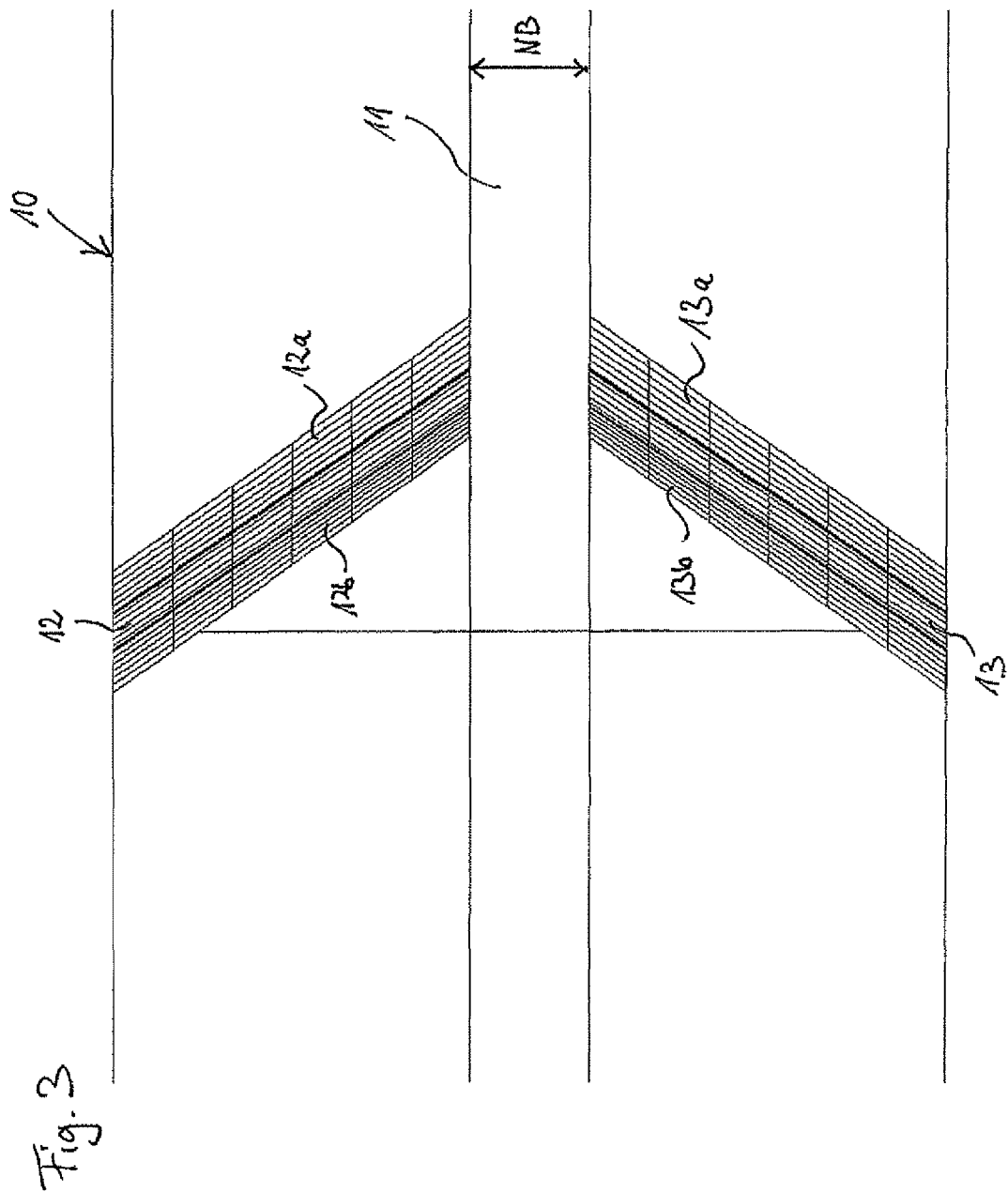
FIG. 3 shows a top view onto the space widths of the herringbone gearing of FIG. 1.
Figure 4:
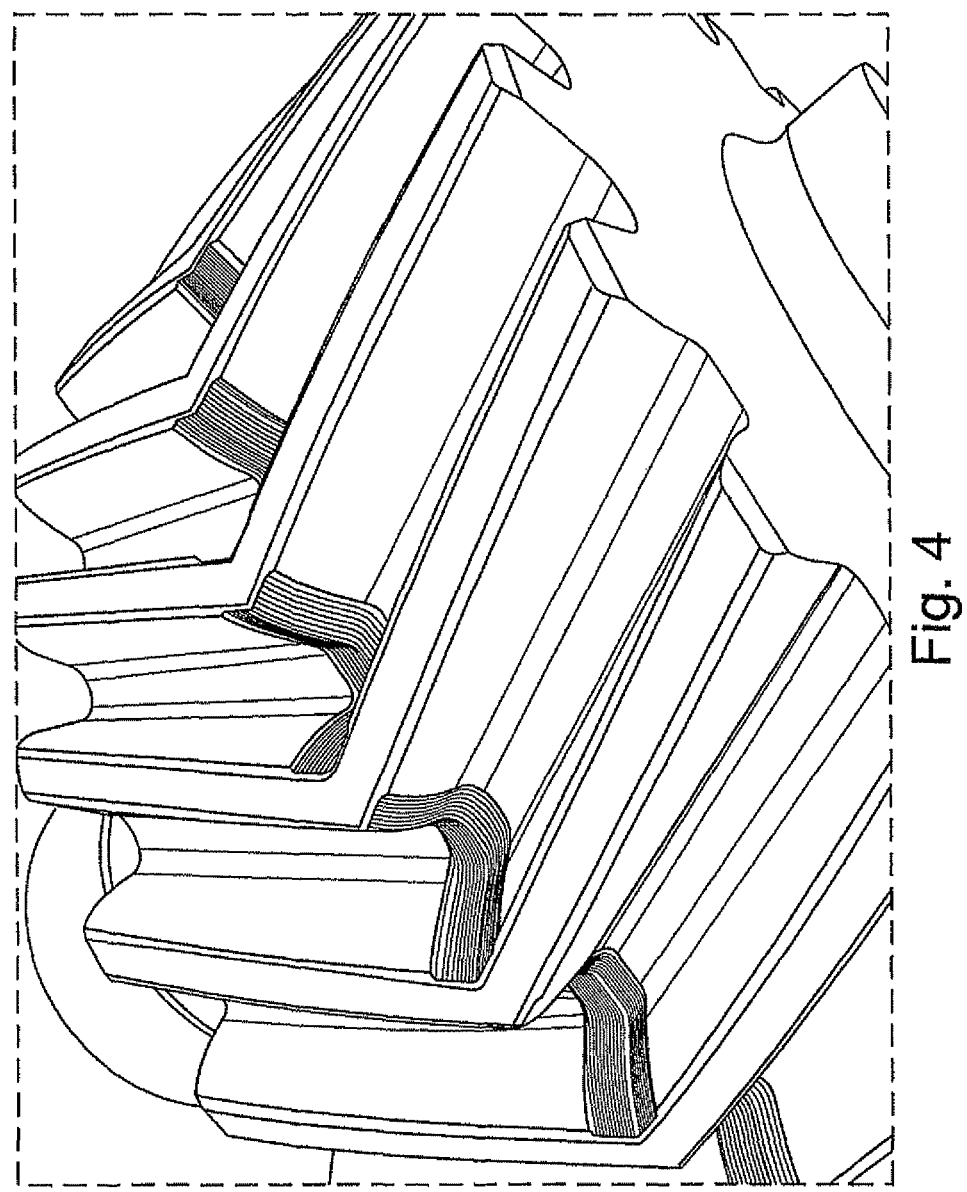
FIG. 4 shows an exemplary photographic presentation of a toothed wheel having a herringbone gearing without central groove.
Figure 5:
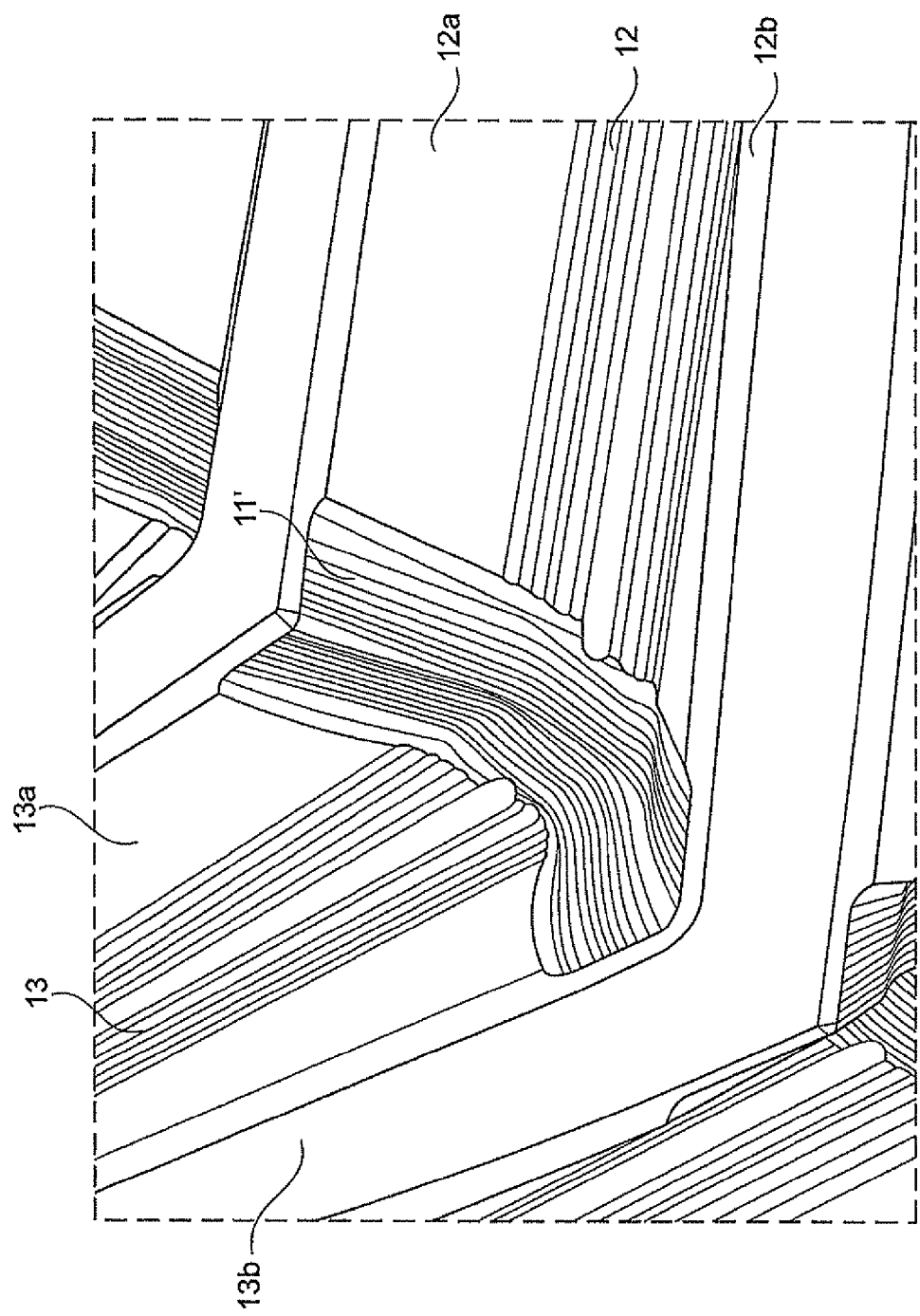
FIG. 5 shows a photographic detail of a toothed wheel having a herringbone gearing without central groove of FIG. 4.

Preferred exemplary embodiments of the present invention are described in detail below with reference to the enclosed figures. However, the present invention is not limited to the exemplary embodiments as described. The present invention is defined by the scope of the claims. Equal and/or similar features of the exemplary embodiments are denoted by equal reference numbers in the figures.

It is basically known in the prior art to calculate a geometric model of a workpiece having a gearing, of a gearing and a tooth flank, respectively, e.g. by means of a CAD system, in so far as gearing information data required is predetermined and/or determined. For this purpose, in particular the following data may be required to be able to calculate a mathematical or numerical model of the tooth flank:

Data indicating a dimension and shape of the entire workpiece before and/or after machining (e.g. data for calculating an unmachined part geometry and/or finished part geometry and a model, respectively, of an unmachined part geometry and/or finished part geometry), data indicating a type of the design of the gearing, i.e. in particular e.g. a design from the possible designs, e.g. in the case of herringbone gearings in general a spur gear, data indicating a type of gearing, in particular e.g. a herringbone gearing including angle of pressure and helix angle, data indicating a tooth flank profile shape, in particular e.g. a tooth flank profile shape from the tooth flank profile shapes, i.e. evolvent profile, cycloidal profile, and circular arc profile or others, data indicating a dimension and/or shape of a tooth geometry of the gearing, in particular e.g. depth of teeth, tooth thickness, tooth width or similar parameters, and/or data indicating a number of the teeth and/or a normal module of the gearing.

On account of the above mentioned data, it is then easily possible to calculate a mathematically accurate model of a workpiece having a gearing, including tooth flanks which correspond to an accurate mathematical tooth flank geometry that in particular in profile precisely has the predetermined tooth flank profile shape, e.g. an evolvent profile shape.

Based on such a calculated model, e.g. a model calculated by means of a CAD system, it is also possible to calculate path data on the basis of the model, e.g. for generating an NC program, e.g. by means of a CAM or CAD/CAM system, which are comprised in control data by means of which a tool, such as an end mill or others, can be guided on a numerically controlled machine tool having at least 4 axes, for example a milling machine, a universal milling machine or a universal machining center, to produce a tooth flank on the workpiece by moving the milling cutter successively and line by line along the machining paths in successive and/or line-by-line fashion. In this connection, reference is to be made in particular to the teaching of DE 10 2009 008 124, which describes how to preferably produce such machining paths based on a predetermined tooth flank geometry.

Figure 6:
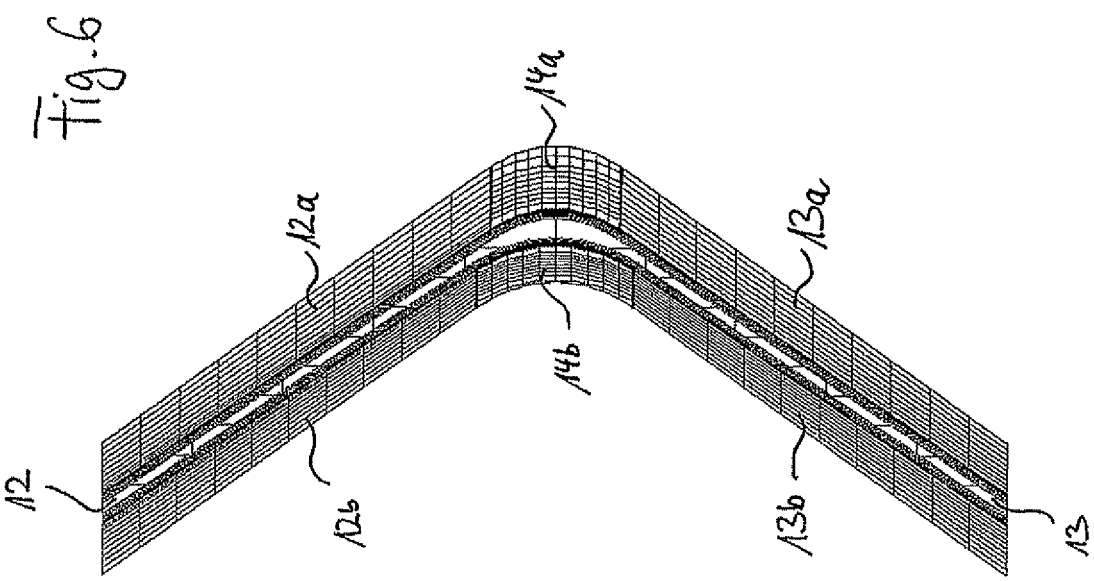
FIG. 6 shows a top view onto a geometric design of a space width of a toothed wheel design having first and second tooth flank overall geometries according to an exemplary embodiment of the present invention.
Figure 7:
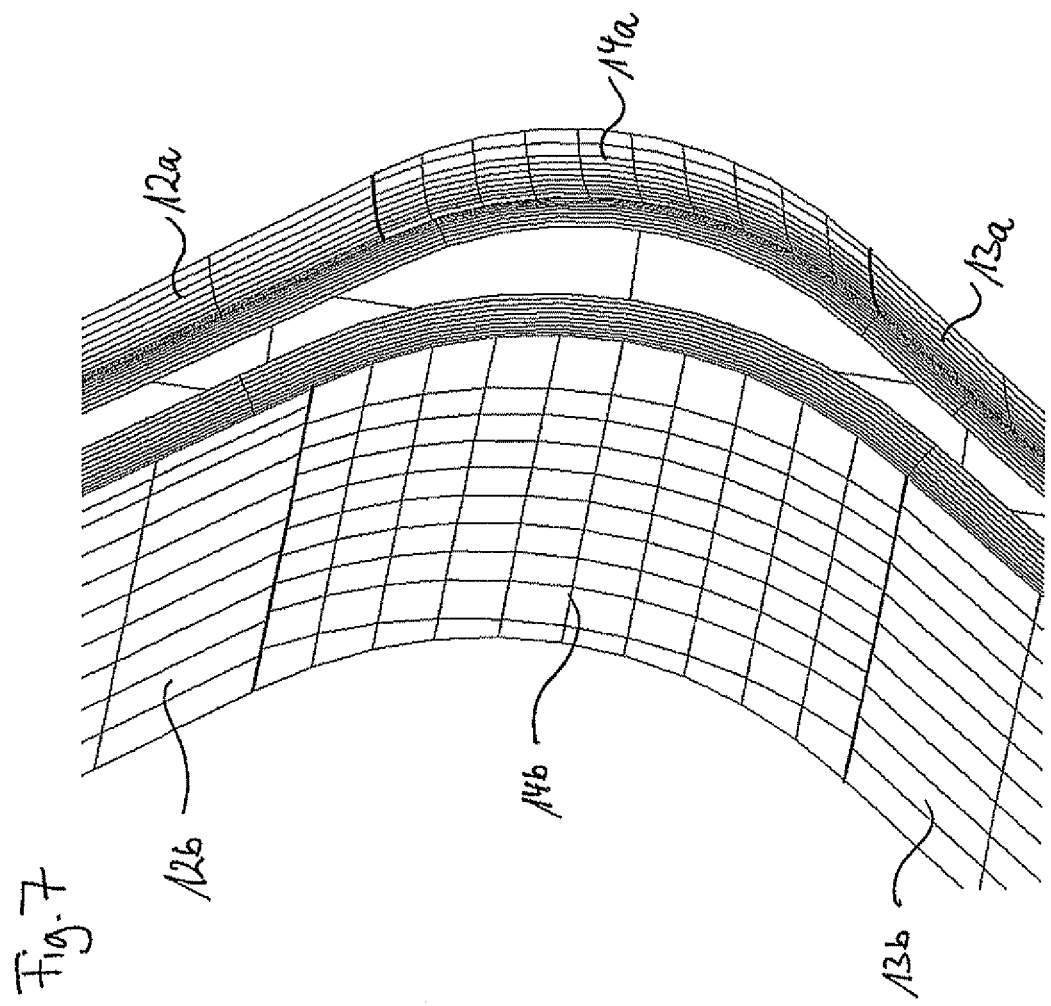
FIG. 7 shows a detailed perspective view of the geometric model of the space width of FIG. 6.

FIG. 6 shows a top view onto a geometric model of a space width of a toothed wheel model having first and second tooth flank overall geometries according to an exemplary embodiment of the present invention. FIG. 7 shows a detailed perspective view of the geometric model of the space width of FIG. 6.

The geometric model of a space width of FIG. 6 is a model of a space width of a herringbone gearing having left-hand and right-hand helical gearings and comprises a first tooth flank geometry 12a which corresponds to a geometry of a first tooth flank of the first helical gearing, and a second tooth flank geometry 13a which corresponds to a geometry of a second tooth flank of the second helical gearing, the first tooth flank geometry 12a and the second tooth flank geometry 13a being connected by a transition geometry 14a having a concave shape. The first tooth flank geometry 12a, the transition section geometry 14a and the second tooth flank geometry 13a form an overall tooth flank geometry on the basis of which control data is generated, e.g. according to the teaching of DE 10 2009 008 124, the control data indicating path data each extending transversely to the profile direction of the tooth flank geometries 12a and 13a, in particular at different profile heights, and along the first tooth flank geometries 12a, the transition section geometry 14a and the second tooth flank geometry 13a. The two helical gearings of the herringbone gearing have the same helix angle in this exemplary embodiment.

The geometric model of the space width comprises a third tooth flank geometry 12b and a fourth tooth flank geometry 13b, which are connected by a transition geometry 14b having a convex shape. The tooth flank geometries 12a and 12b face each other and the tooth flank geometries 13a and 13b face each other. The third tooth flank geometry 12b, the transition section geometry 14b and the fourth tooth flank geometry inform a further overall tooth flank geometry on the basis of which control data can be generated as well, e.g. according to the teaching of DE 10 2009 008 124, the control data indicating path data each extending transversely to the profile direction of the tooth flank geometries 12b and 13b, in particular at different profile heights, and along the third tooth flank geometry 12b, the transition section geometry 14b and the fourth tooth flank geometry 13b. It is thus all in all possible to cut the space width out of a workpiece in milling fashion based on the generated control data.

Figure 8:
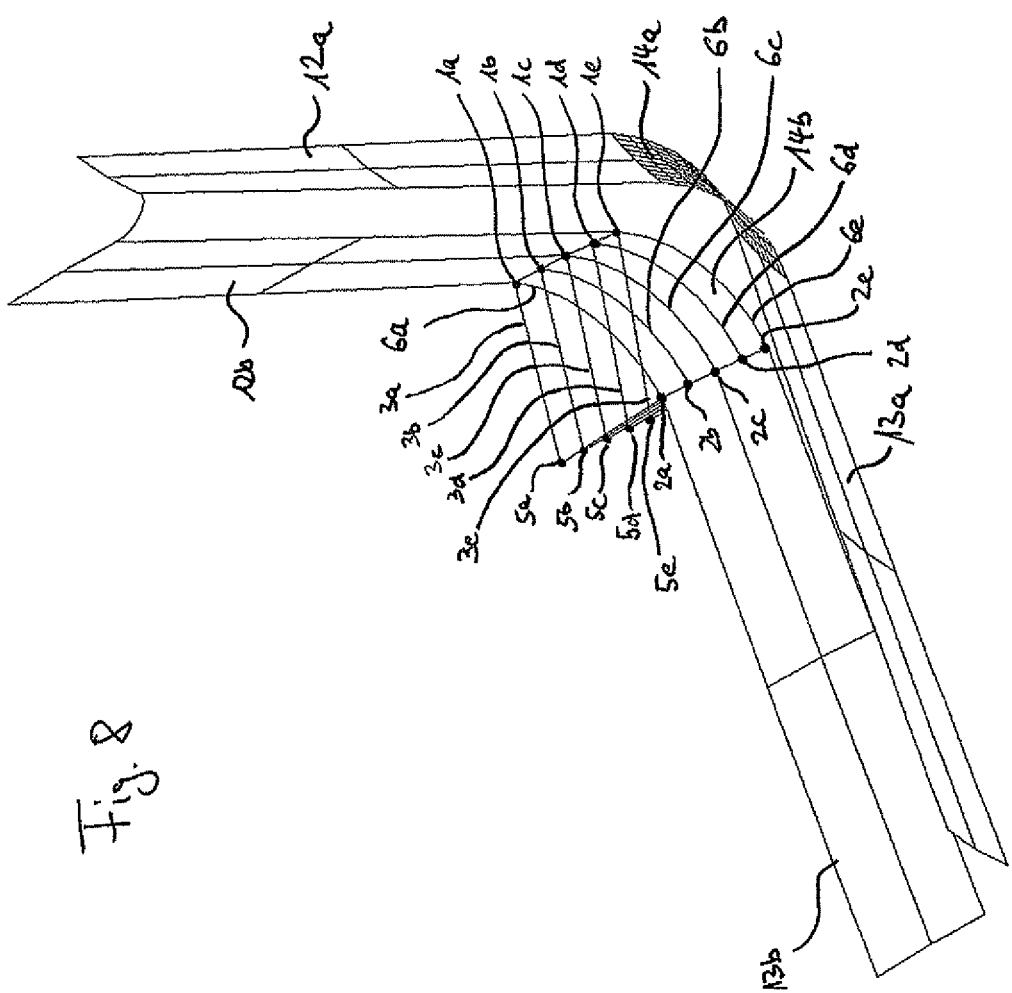
FIG. 8 shows a perspective view of the geometric model of the space width of FIG. 6 including subsidiary lines.
Figure 9:
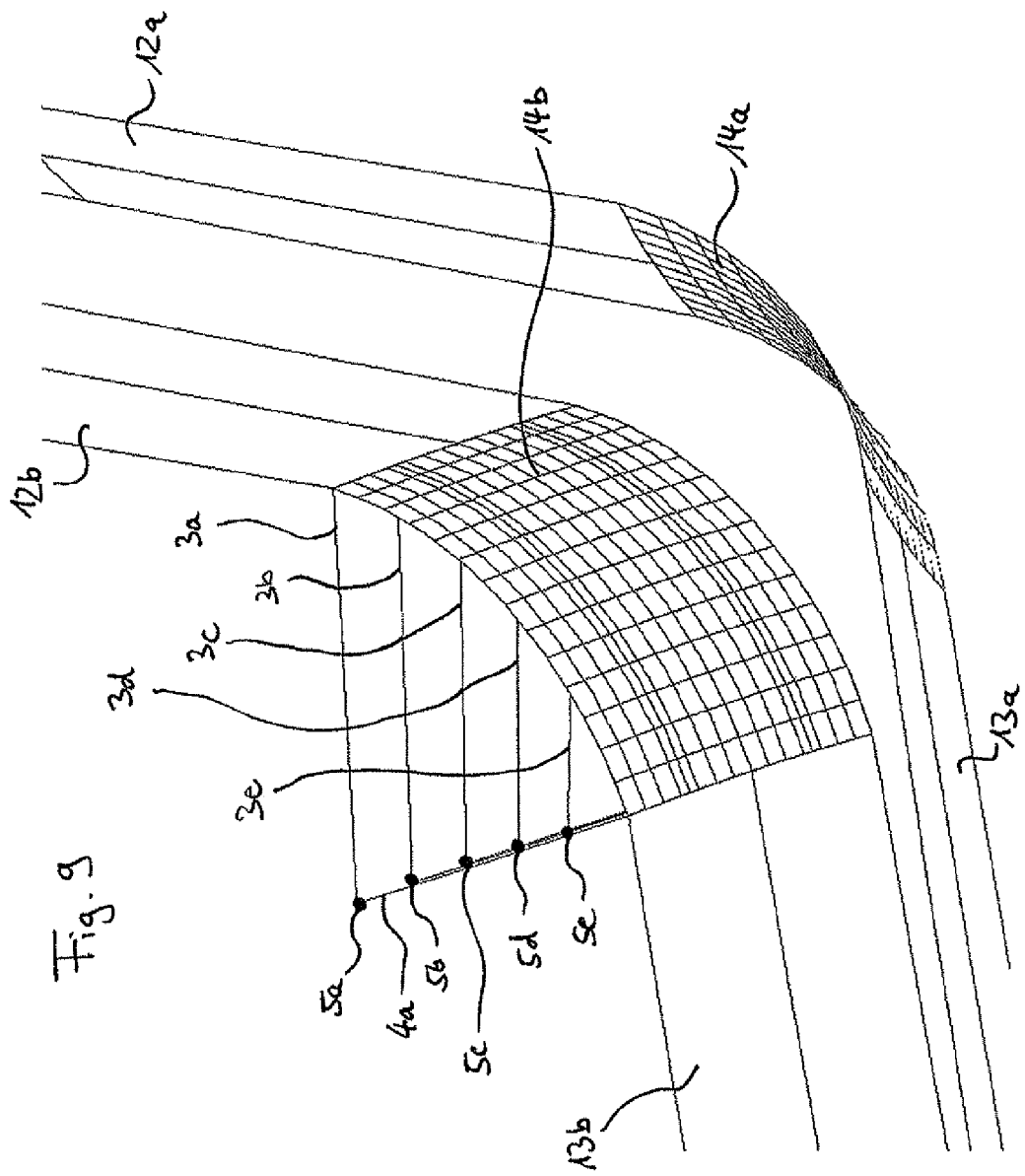
FIG. 9 shows a detailed perspective view of the geometric model of the space width of FIG. 6 including subsidiary lines.
Figure 10:
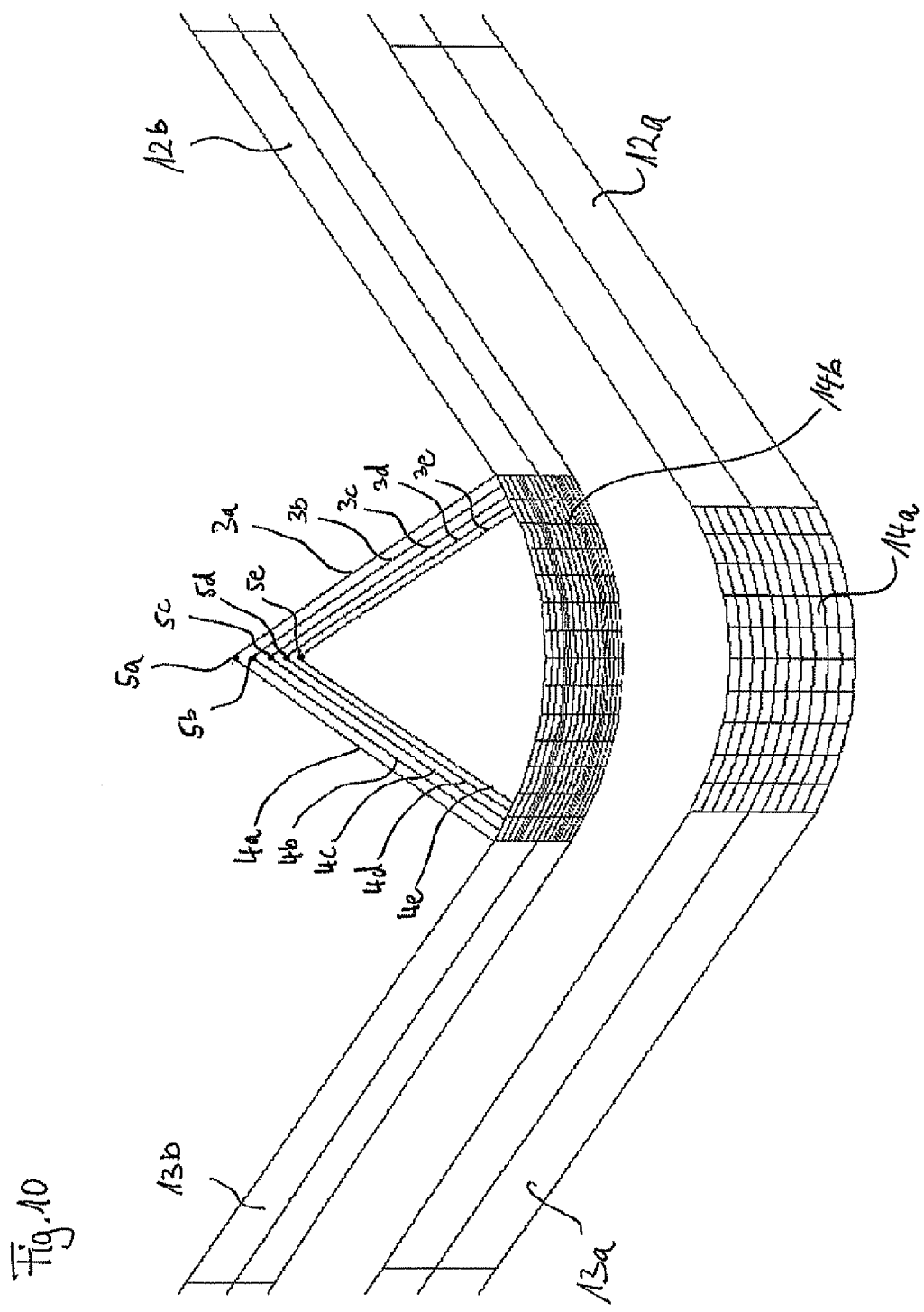
FIG. 10 shows a perspective view of the geometric model of the space width of FIG. 6 including subsidiary lines.
Figure 11:
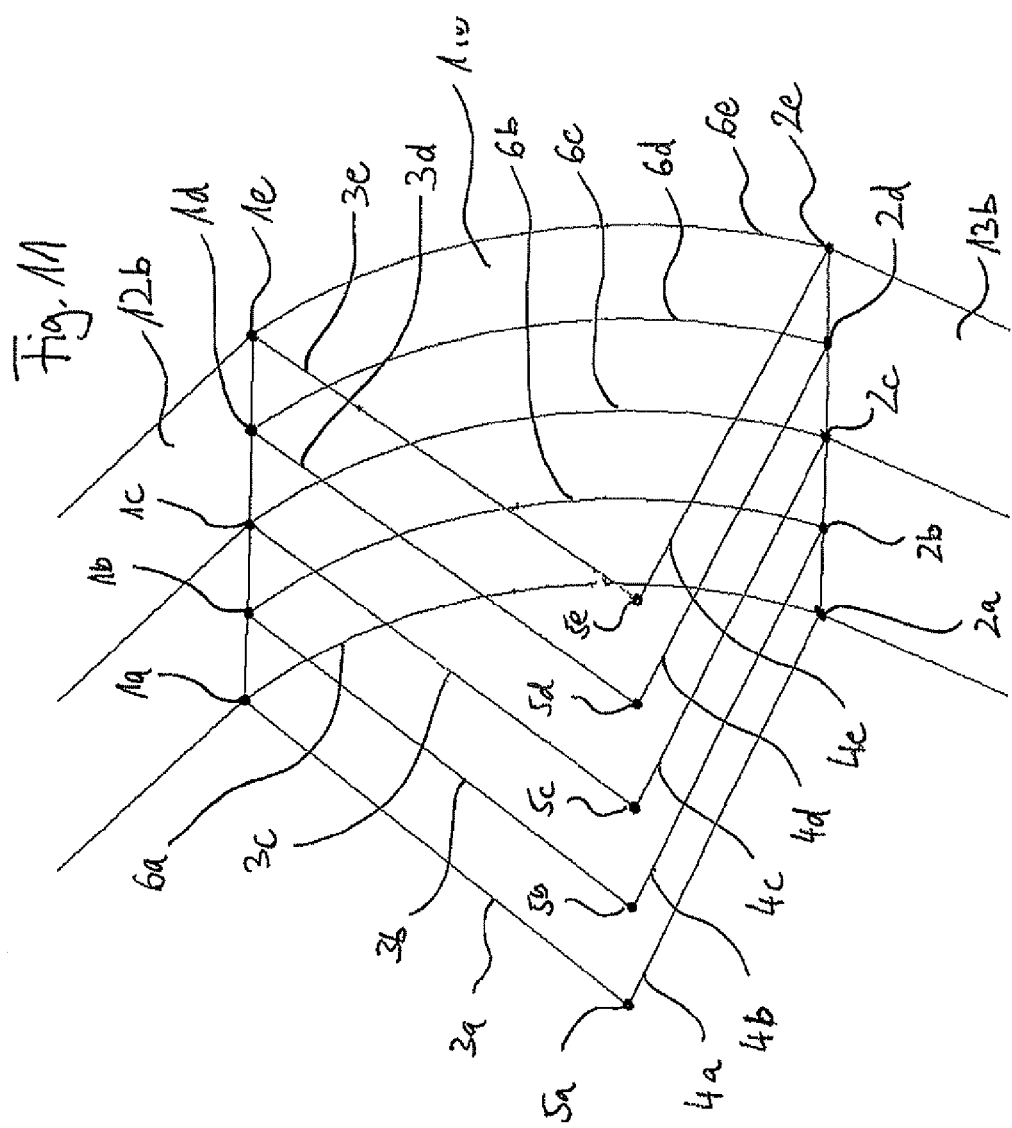
FIG. 11 shows a detailed perspective view of the geometric model of the space width of FIG. 6 including subsidiary lines.

According to this exemplary embodiment, the transition section geometries 14a and 14b form respective fillet surfaces which connect the respective tooth flank geometries 12a and 13a or 12b and 13b and in each case are designed from a plurality of circular arc segments, which at boundary points of the tooth flank geometries merge tangentially into the tooth flank geometries in each case. An exemplary embodiment of a design method for a circular arc segment defining a transition section geometry is described below by way of example with reference to FIGS. 8 to 11 with respect to the transition section geometry 14b. FIG. 8 shows a perspective view onto the geometric model of the space width of FIG. 6 including subsidiary lines. FIG. 9 shows a detailed perspective view of the geometric model of the space width of FIG. 6 including subsidiary lines. FIG. 10 shows a perspective view of the geometric model of the space width of FIG. 6 including subsidiary lines. FIG. 11 shows a detailed perspective view of the geometric model of the space width of FIG. 6 including subsidiary lines.

Boundary points are determined at the boundary areas of the tooth flank geometries 12a and 13b. Here, boundary points 1a, 1b, 1c, 1d and 1e are determined at the boundary of the tooth flank geometry 12b at different profile heights, said points being all located on a cutting path of the tooth flank geometry 12b with a cut surface perpendicular to the central axis of the toothed wheel. Furthermore, boundary points 2a, 2b, 2c, 2d and 2e located at the boundary of the tooth flank geometry 13b at different profile heights are determined, which are all located on a cutting path of the tooth flank geometry 13b with a further cut surface perpendicular to the central axis of the toothed wheel. The two cut surfaces here have equal distance from the center of the herringbone gearing which is predetermined by the symmetry axis of the herringbone gearing (see in this connection also the top view of FIG. 6). FIG. 6 also shows that the boundary points of the convex transition section geometry 14b and/or the tooth flank geometries 12b and 13b have a greater distance from the center of the herringbone gearing than the boundary points of the concave transition section geometry 14a and/or the tooth flank geometries 12a and 13a, and therefore the rounding radii according to this exemplary embodiment are greater for the convex transition geometry 14b than for the concave transition geometry 14a.

All of the boundary points 1a to 1e of the tooth flank geometry 12b are located in pairs with the boundary points 2a to 2e of the tooth flank geometries 13b at equal profile height of the tooth flank geometries 12b and 13b (i.e. boundary point 1a is located at equal profile height as boundary point 2a, boundary point 1b is located at equal profile height as boundary point 2b, etc.), the tooth flank geometries 12b and 13b also having an equal profile shape in each case.

In a next step, the normal vectors on the tooth flank geometries 12b and 13b in the boundary points 1a to 1e and 2a to 2e are determined so as to be able to define the surface normals (straight lines) 3a to 3e and the surface normals (straight lines) 4a to 4e. The surface normal 3a extends perpendicularly to the tooth flank geometry 12b through boundary point 1a, the surface normal 3b extends perpendicularly to the tooth flank geometry 12b through boundary point 1b, the surface normal 3c extends perpendicularly to the tooth flank geometry 12b through boundary point 1c, the surface normal 3d extends perpendicularly to the tooth flank geometry 12b through boundary point 1d and the surface normal 3e extends perpendicularly to the tooth flank geometry 12b through boundary point 1e. In analogy, the surface normal 4a extends perpendicularly to the tooth flank geometry 13b through boundary point 2a, the surface normal 4b extends perpendicularly to the tooth flank geometry 13b through boundary point 2b, the surface normal 4c extends perpendicularly to the tooth flank geometry 13b through boundary point 2c, the surface normal 4d extends perpendicularly to the tooth flank geometry 13b through boundary point 2d and the surface normal 4e extends perpendicularly to the tooth flank geometry 13b through boundary point 2e.

Since in this exemplary embodiment the profile shape of the tooth flank geometries 12b and 13b is equal, the boundary points are arranged in pairs at equal profile height and the helix angles of the tooth flank geometries 12b and 13b are equal, the surface normals 3a to 3e and 4a to 4e intersect one another pair-wise in intersection points 5a to 5e (see in particular FIG. 11). These intersection points 5a to 5e can be determined as centers of circular arc segments 6a to 6e, the circular arc segment 6a having intersection point 5a as the center and connecting boundary points 1a and 2a, the circular arc segment 6b having intersection point 5b as the center and connecting boundary points 1b and 2b, the circular arc segment 6c having intersection point 5c as the center and connecting boundary points 1c and 2c, the circular arc segment 6d having intersection point 5d as the center and connecting boundary points 1d and 2d, and the circular arc segment 6e having intersection point 5e as the center and connecting boundary points 1e and 2e (see in particular FIG. 11). As a result of the design by means of surface normals 3a to 3e and 4a to 4e in boundary points 1a to 1e and 2a to 2e, the circular arc segments 6a to 6e merge tangentially into boundary points 1a to 1e of the tooth flank geometry 12b and into boundary points 2a to 2e of the tooth flank geometry 13b.

It is now possible to define the transition section geometry 14b by the circular arc segments 6a to 6e, the transition geometry 14b comprising the circular arc segments 6a to 6e extending at different profile heights.

Thus, control data for guiding the milling cutter relative to the workpiece can be generated by carrying out the following steps: determining a tooth flank geometry 12b which corresponds to a geometry of a tooth flank of a first partial gearing of the herringbone gearing, determining a tooth flank geometry 13b which corresponds to a geometry of a tooth flank of a second partial gearing of the herringbone gearing, determining a transition section geometry 14b which corresponds to a geometry of a transition section between the tooth flanks, determining an overall tooth flank geometry which comprises the tooth flank geometry 12b, the transition section geometry 14b and the tooth flank geometry 13b. Then, the control data can be generated based on the overall tooth flank geometry, the control data indicating path data for controlling the milling cutter of the machine tool along machining paths, each of the machining paths extending transversely to the profile direction of the tooth flanks, in particular at different profile heights, and along the tooth flank geometry 12b, the transition section geometry 14b and the tooth flank geometry 13b.

Figure 12:
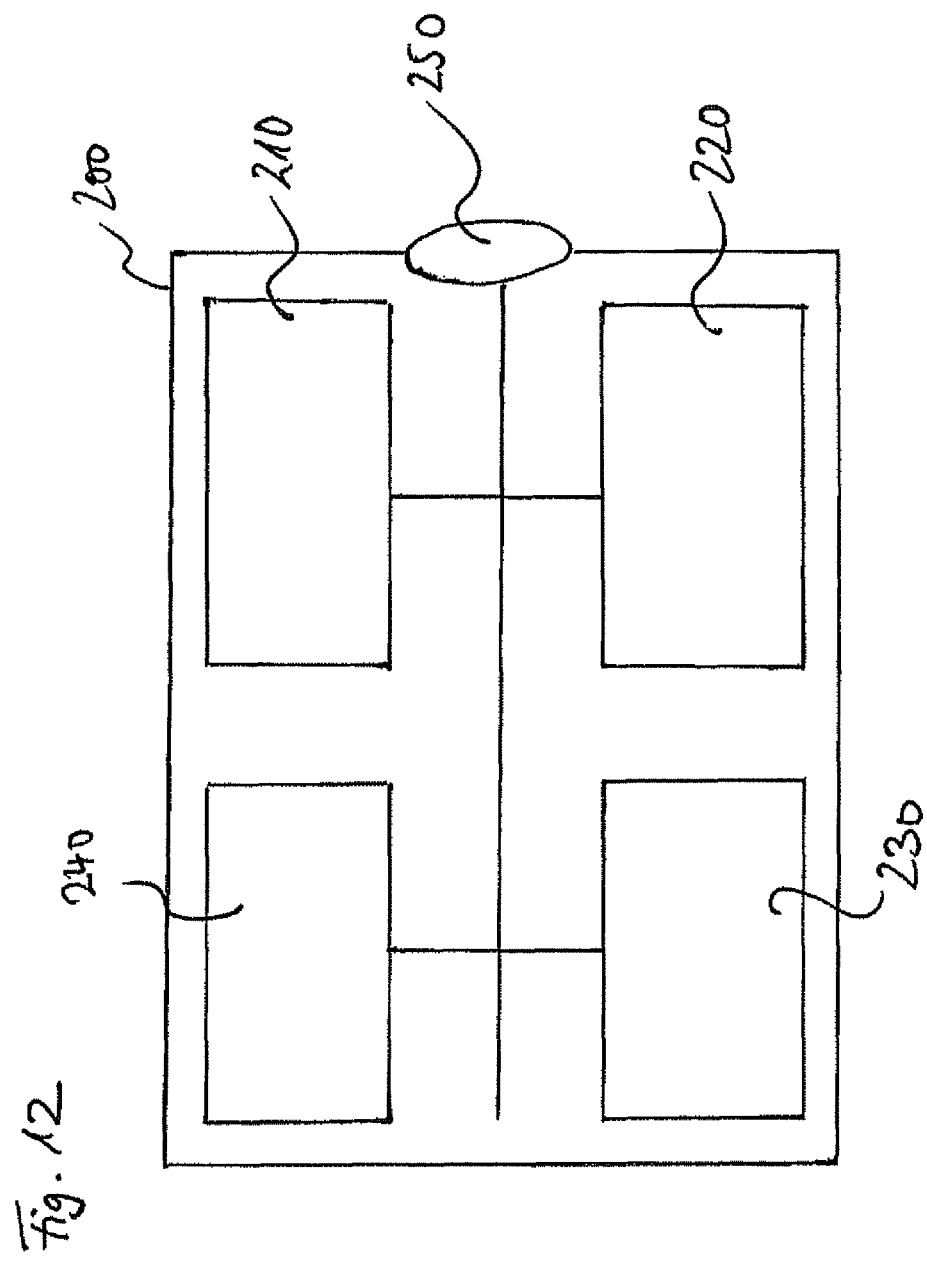
FIG. 12 shows a diagram of an apparatus for generating control data according to exemplary embodiment of the present invention.

FIG. 12 shows by way of diagram an apparatus 200 for generating control data according to an exemplary embodiment of the present invention. Apparatus 200 can be used for generating control data to provide a workpiece with a herringbone gearing by milling the workpiece on a numerically controlled machine tool comprising at least 4 axes, in particular on a milling machine, a universal machine tool or a machining center, by successively moving a milling cutter, in particular an end mill, of the machine tool along machining paths relative to the workpiece based on the control data.

Apparatus 200 comprises a gearing information data input means 210 for inputting gearing information data e.g. by means of a keyboard and/or a computer mouse. The apparatus also comprises a display means 220 for displaying numerically generated workpiece geometries, gearing geometries, one or several tooth flank geometries, one or several transition section geometries and one or several overall tooth flank geometries.

Apparatus 200 additionally comprises a geometry shaping means 230 for determining a first tooth flank geometry (in particular based on inputted gearing information data) which corresponds to a geometry of a first tooth flank of a first partial gearing of the herringbone gearing, for determining a second tooth flank geometry (in particular based on inputted gearing information data) which corresponds to a geometry of a second tooth flank of a second partial gearing of the herringbone gearing, for determining a transition section geometry which corresponds to a geometry of a transition section between the first and second tooth flanks, and for determining an overall tooth flank geometry which comprises the first tooth flank geometry, the transition section geometry and the second tooth flank geometry. The geometry shaping means 230 is in particular suited to determine boundary points on the tooth flank geometries, to determine normal vectors on the boundary points and/or surface normals in the boundary points of the tooth flank geometries, to determine intersection points of the surface normals and/or to determine circular arc segments which determine or define a transition section geometry.

Apparatus 200 also comprises a control data generation means 240 for generating control data based on the overall tooth flank geometry, the control data indicating path data for guiding the milling cutter of the machine tool along machining paths, each of the machining paths extending transversely to the profile direction of the tooth flanks, in particular at different profile heights, and along the first tooth flank geometry, the transition section geometry and the second tooth flank geometry.

Apparatus 200 also comprises an interface 250 serving for storing generated control data on a data carrier serving for transmitting the control data to a machine tool and/or for connection with a machine tool (wireless or by cable connection) for transmitting the control data to the machine tool.

In summary, the present invention further facilitates the machining and/or the production of a toothed wheel having a herringbone gearing, thus reducing the machining times. The present invention also serves for improving the machining and/or production of a toothed wheel having a herringbone gearing on a numerically controlled universal machine tool so as to produce a toothed wheel having a herringbone gearing with greater strength and better running characteristics.

The invention claimed is:

1. A process for producing a toothed wheel having a herringbone gearing by means of milling a workpiece on a numerically controlled machine tool comprising at least 4 axes, a universal machine tool or a machining center, by successively moving a milling cutter, of the machine tool along machining paths relative to the workpiece based on control data, comprising:
    generating the control data for guiding the milling cutter relative to the workpiece, comprising:
    determining a first tooth flank geometry which corresponds to a geometry of a first tooth flank of a first partial gearing of the herringbone gearing,
    determining a second tooth flank geometry which corresponds to a geometry of a second tooth flank of a second partial gearing of the herringbone gearing,
    determining a transition section geometry which corresponds to a geometry of a transition section between the first tooth flank and the second tooth flank,
    determining an overall tooth flank geometry which comprises the first tooth flank geometry, the transition section geometry and the second tooth flank geometry, and
    generating the control data based on the overall tooth flank geometry, the control data indicating path data for guiding the milling cutter of the machine tool along machining paths, each of the machining paths extending transversely to the profile direction of the tooth flanks, and along the first tooth flank geometry, the transition section geometry and the second tooth flank geometry; and
    milling the workpiece on the machine tool using a milling cutter based on the generated control data, the milling cutter being successively guided along the machining paths indicated by the path data.

2. The process according to claim 1, wherein the transition section geometry is produced such that at a plurality of boundary points of the first tooth flank geometry the first tooth flank geometry merges tangentially into the transition section geometry and, at a plurality of boundary points of the second tooth flank geometry, the transition section geometry merges tangentially into the second tooth flank geometry.

3. The process according to claim 2, wherein the boundary points of the first tooth flank geometry are determined on a first cutting path between the first tooth flank geometry and a first cut surface perpendicular to the toothed wheel axis and the boundary points of the second tooth flank geometry are determined on a second cutting path between the second tooth flank geometry and a second cut surface perpendicular to the toothed wheel axis.

4. The process according to claim 3, comprising determining a central area of the herringbone gearing, which is perpendicular to the toothed wheel axis, the first cut surface and the second cut surface having equal distance from the central area of the herringbone gearing and the central area being located between the first and second cut surfaces.

5. The process according to claim 1, wherein the transition section geometry has a concave shape or a convex shape in the tooth flank line direction.

6. The process according to claim 1, wherein the transition section geometry corresponds to a rounded surface, between the first tooth flank geometry and the second tooth flank geometry.

7. The process according to claim 6, wherein the transition section geometry is determined by a plurality of circular arc segments connecting the first tooth flank geometry and the second tooth flank geometry.

8. The process according to claim 7, wherein the circular arc segments of the transition section geometry extend at different profile heights and each circular arc segment connects a respective first boundary point of the first tooth flank geometry with a respective second boundary point of the second tooth flank geometry, the respective first boundary point and the respective second boundary point being determined at equal profile height.

9. The process according to claim 8, wherein the circular arc segments merge tangentially into the respective tooth flank geometry at the respective boundary points of the respective tooth flank geometry.

10. The process according to claim 1, wherein the step of producing a transition section geometry comprises:
    determining at least one first boundary point of the first tooth flank geometry,
    determining at least one second boundary point of the second tooth flank geometry, the first boundary point and the second boundary point being determined at equal profile height of the tooth flanks,
    determining a first normal vector on the first tooth flank geometry in the first boundary point,
    determining a second normal vector on the second tooth flank geometry in the second boundary point,
    determining an intersection point between a first straight line and a second straight line, the first straight line being predetermined by the direction of the first normal vector and the second straight line being predetermined by the direction of the second normal vector, and
    determining a circular arc segment from the first boundary point to the second boundary point, the intersection point between the first straight line and the second straight line being the center of the circular arc segment,
    the transition section geometry being produced so as to comprise the circular arc segment.

11. The process according to claim 1, wherein the first partial gearing is a first helical gearing of the herringbone gearing and the second partial gearing is a second helical gearing of the herringbone gearing.

12. The process according to claim 11, wherein the first helical gearing is left-hand or right-hand and the second helical gearing has a pitch opposed to the pitch of the first helical gearing.

13. The process according to claim 1, wherein the first tooth flank geometry and the second tooth flank geometry have an equal tooth flank profile shape, in particular an equal evolvent profile shape.

14. The process according to claim 1, wherein the overall tooth flank geometry is a first overall tooth flank geometry which has concave shape in the tooth flank line direction, and the step of generating the control data also comprises:
    determining a third tooth flank geometry which corresponds to a geometry of a third tooth flank, opposite to the first tooth flank geometry, of the first partial gearing of the herringbone gearing,
    determining a fourth tooth flank geometry which corresponds to a geometry of a fourth tooth flank, opposite to the second tooth flank geometry, of the second partial gearing of the herringbone gearing,
    determining a second transition section geometry which corresponds to a geometry of a transition section between the third tooth flank and the fourth tooth flank and has a convex shape in the tooth flank line direction, and
    determining at least one second overall tooth flank geometry which comprises the third tooth flank geometry, the second transition section geometry and the fourth tooth flank geometry,
    the control data being also generated based on the second overall tooth flank geometry and indicating further path data for guiding the milling cutter of the machine tool, each of the further machining paths extending transversely to the profile direction of the third and fourth tooth flanks and along the third tooth flank geometry, the second transition section geometry and the fourth tooth flank geometry.

15. The process according to claim 14, wherein
    the first transition section geometry is produced such that at the plurality of boundary points of the first tooth flank geometry the first tooth flank geometry merges substantially tangentially into the first transition section geometry and, at a plurality of boundary points of the second tooth flank geometry, the first transition section geometry merges substantially tangentially into the second tooth flank geometry, and
    the second transition section geometry is produced such that at a plurality of boundary points of the third tooth flank geometry the third tooth flank geometry merges substantially tangentially into the second transition section geometry and, at a plurality of boundary points of the fourth tooth flank geometry, the second transition flank geometry merges substantially tangentially into the fourth tooth flank geometry, wherein
    the boundary points of the first tooth flank geometry are determined on a first cutting path between the first tooth flank geometry and a first cut surface perpendicular to the toothed wheel axis, and the boundary points of the second tooth flank geometry are determined on a second cutting path between the second tooth flank geometry and a second cut surface perpendicular to the toothed wheel axis, and
    the boundary points of the third tooth flank geometry are determined on a third cutting path between the third tooth flank geometry and a third cut surface perpendicular to the toothed wheel axis and the boundary points of the fourth tooth flank geometry are determined on a fourth cutting path between the fourth tooth flank geometry and a fourth cut surface perpendicular to the toothed wheel axis.

16. The process according to claim 15, wherein the distance between the first cut surface and the second cut surface is smaller than that between the third cut surface and the fourth cut surface.

17. A process for generating control data for forming a herringbone gearing on a workpiece according to a manufacturing process as defined in claim 1 by milling the workpiece on a numerically controlled machine tool comprising at least 4 axes, a universal machine tool or a machining center, by successively moving a milling cutter, of the machine tool along machining paths relative to the workpiece based on the control data, comprising:
    determining a first tooth flank geometry which corresponds to a geometry of a first tooth flank of a first partial gearing of the herringbone gearing,
    determining a second tooth flank geometry which corresponds to a geometry of a second tooth flank of a second partial gearing of the herringbone gearing,
    determining a transition section geometry which corresponds to a geometry of a transition section between the first and second tooth flanks,
    determining an overall tooth flank geometry which comprises the first tooth flank geometry, the transition section geometry and the second tooth flank geometry, and
    generating control data based on the overall tooth flank geometry, the control data indicating path data for guiding the milling cutter of the machine tool along machining paths, each of the machining paths extending transversely to the profile direction of the tooth flanks, and along the first tooth flank geometry, the transition section geometry and the second tooth flank geometry.

18. An apparatus for generating control data for developing a herringbone gearing on a workpiece according to a manufacturing process according to claim 1 by milling the workpiece on a numerically controlled machine tool comprising at least 4 axes, a universal machine tool or a machining center, by successively moving a milling cutter, of the machine tool along machining paths relative to the workpiece based on the control data, comprising:

a geometry shaping means for determining a first tooth flank geometry which corresponds to a geometry of a first tooth flank of a first partial gearing of the herringbone gearing, for determining a second tooth flank geometry which corresponds to a geometry of a second tooth flank of a second partial gearing of the herringbone gearing, for determining a transition section geometry which corresponds to a geometry of a transition section between the first and second tooth flanks, and for determining an overall tooth flank geometry which comprises the first tooth flank geometry, the transition section geometry and the second tooth flank geometry, and a control data generation means for generating control data based on the overall tooth flank geometry, the control data indicating path data for guiding the milling cutter of the machine tool along machining paths, each of the machining paths extending transversely to the profile direction of the tooth flanks, in particular at different profile heights, and along the first tooth flank geometry, the transition section geometry and the second tooth flank geometry.

19. A numerically controlled machine tool comprising at least 4 axes, universal machine tool or machining center, for milling a workpiece by successively moving a milling cutter, of the machine tool along machining paths based on generated control data, comprising an apparatus for generating control data according to claim 18.

20. A computer program product which comprises a computer-readable medium and a computer program stored therein, wherein the computer program is stored in the form of a sequence of states which corresponds to commands adapted to be processed by a data processing means of a data processing device so as to form an apparatus for generating control data according to claim 18.

\* \* \* \* \*